United States Patent
Negishi et al.

(10) Patent No.: US 12,530,893 B2
(45) Date of Patent: Jan. 20, 2026

(54) INFORMATION PROCESSING APPARATUS

(71) Applicant: YOKOGAWA ELECTRIC CORPORATION, Tokyo (JP)

(72) Inventors: Moyu Negishi, Musashino (JP); Kenji Oishi, Musashino (JP); Hideo Uemura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 384 days.

(21) Appl. No.: 17/810,434

(22) Filed: Jul. 1, 2022

(65) Prior Publication Data

US 2023/0009404 A1    Jan. 12, 2023

(30) Foreign Application Priority Data

Jul. 5, 2021 (JP) .................................. 2021-111815

(51) Int. Cl.
*G06V 20/40* (2022.01)
*B64U 10/13* (2023.01)
(Continued)

(52) U.S. Cl.
CPC ............. *G06V 20/46* (2022.01); *B64U 10/13* (2023.01); *G06V 20/17* (2022.01); *B64U 2101/30* (2023.01)

(58) Field of Classification Search
CPC ......... G06V 20/46; G06V 20/49; G06V 20/17
See application file for complete search history.

(56) References Cited

U.S. PATENT DOCUMENTS

| | | | |
|---|---|---|---|
| 7,991,196 B2 * | 8/2011 | Tener | G06T 3/4038 382/294 |
| 9,875,409 B2 * | 1/2018 | Ohmura | G06V 10/7788 |

(Continued)

FOREIGN PATENT DOCUMENTS

| | | |
|---|---|---|
| JP | 2012-49774 A | 3/2012 |
| JP | 2019-36907 A | 3/2019 |

(Continued)

OTHER PUBLICATIONS

J. Cao, L. Yu, M. Chen and X. Cui, "A Key Frame Selection Algorithm Based on Sliding Window and Image Features," 2016 IEEE 22nd International Conference on Parallel and Distributed Systems (ICPADS), Wuhan, China, 2016, pp. 956-962, doi: 10.1109/ICPADS.2016.0128. (Year: 2016).*

(Continued)

*Primary Examiner* — Chan S Park
*Assistant Examiner* — Paulo Andres Garcia
(74) *Attorney, Agent, or Firm* — RANKIN, HILL & CLARK LLP

(57) ABSTRACT

An information processing apparatus (10) according to the present disclosure includes an image acquisition interface (131) that acquires a video of an inspection target from a flying object (20), the video having been taken by the flying object (20) in flight, a memory (12) storing a reference still image serving as a reference for analysis and a threshold of similarity between the reference still image and frames included in the acquired video, and an image extractor (132) that calculates the similarity to the reference still image for each frame and extracts a plurality of consecutive frames as an analysis target based on the similarity and the threshold.

6 Claims, 6 Drawing Sheets

(51) Int. Cl.
    *B64U 101/30*        (2023.01)
    *G06V 20/17*         (2022.01)

(56)                References Cited

U.S. PATENT DOCUMENTS

| 10,329,017 | B2* | 6/2019 | Noto | G05D 1/0011 |
|---|---|---|---|---|
| 11,049,261 | B2* | 6/2021 | Tang | H04N 21/8549 |
| 11,149,717 | B2* | 10/2021 | Michini | B64C 39/024 |
| 11,189,037 | B2* | 11/2021 | Lin | G06F 16/2255 |
| 11,235,823 | B2* | 2/2022 | Abdelkader | B62D 9/002 |
| 11,258,949 | B1* | 2/2022 | Huang | G06V 10/243 |
| 2020/0293045 | A1* | 9/2020 | Ghiglino Novoa | G05D 1/0094 |
| 2022/0058591 | A1* | 2/2022 | Xiong | G06F 18/2113 |
| 2022/0114750 | A1* | 4/2022 | Sun | G06V 10/757 |

FOREIGN PATENT DOCUMENTS

| JP | 2021-22846 A | 2/2021 |
|---|---|---|
| WO | 2009/001467 A1 | 12/2008 |
| WO | 2020/174916 A1 | 9/2020 |

OTHER PUBLICATIONS

Y. X. Hong, Z. Q. Jie, Z. Dan Dan, S. X. Xin and X. Jing, "UAV image automatic mosaic method based on matching of feature points," 2013 Chinese Automation Congress, Changsha, China, 2013, pp. 33-36, doi: 10.1109/CAC.2013.6775697. (Year: 2013).*

Zhou, Y.; Wu, C.; Wu, Q.; Eli, Z.M.; Xiong, N.; Zhang, S. Design and Analysis of Refined Inspection of Field Conditions of Oilfield Pumping Wells Based on Rotorcraft UAV Technology. Electronics 2019, 8, 1504. https://doi.org/10.3390/electronics8121504 (Year: 2019).*

M. Stokkeland, K. Klausen and T. A. Johansen, "Autonomous visual navigation of Unmanned Aerial Vehicle for wind turbine inspection," 2015 International Conference on Unmanned Aircraft Systems (ICUAS), Denver, CO, USA, 2015, pp. 998-1007, doi: 10.1109/ICUAS.2015.7152389. (Year: 2015).*

E. Mingkhwan and W. Khawsuk, "Digital image stabilization technique for fixed camera on small size drone," 2017 Third Asian Conference on Defence Technology (ACDT), Phuket, Thailand, 2017, pp. 12-19, doi: 10.1109/ACDT.2017.7886149. (Year: 2017).*

* cited by examiner

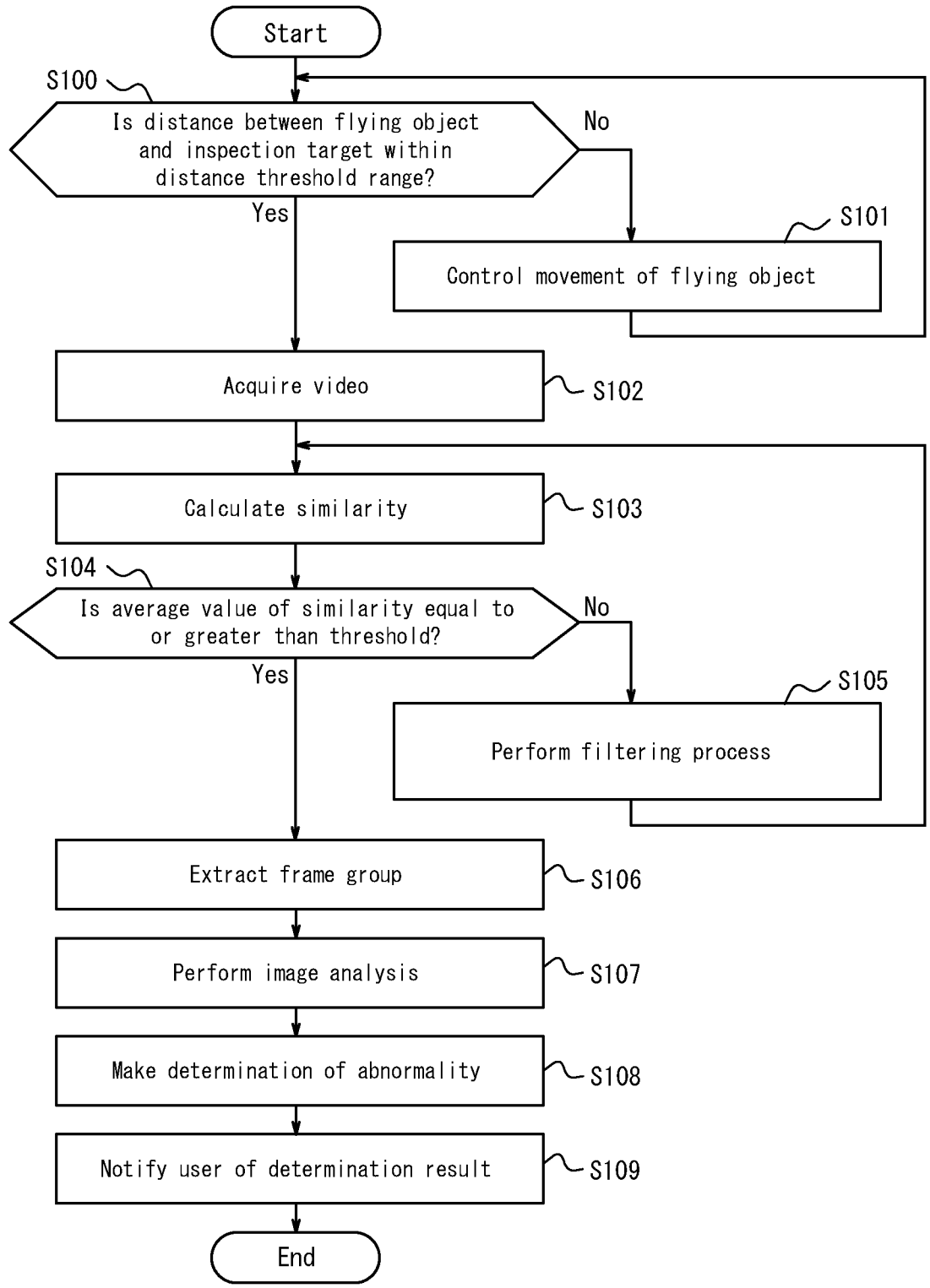

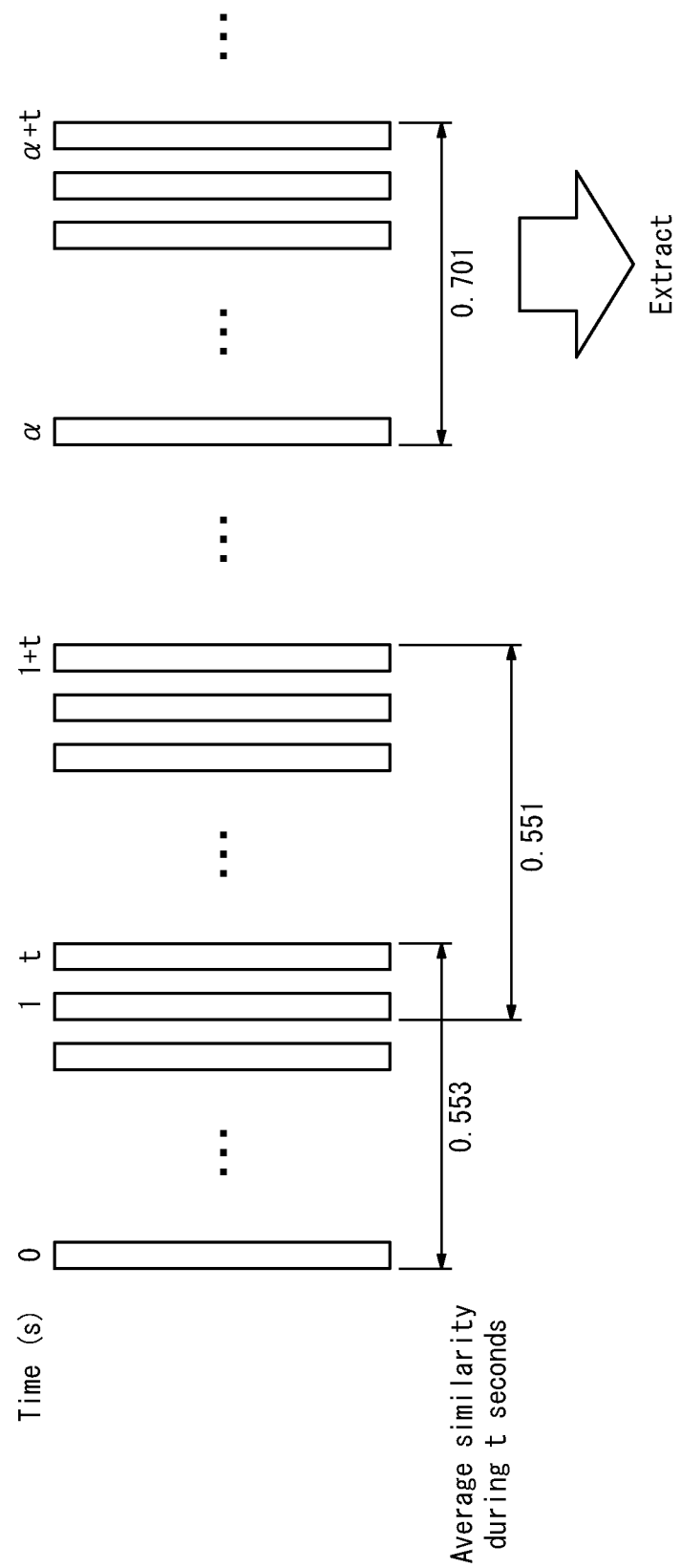

Time range: β to β + t seconds

Time range: β to β + t seconds

INFORMATION PROCESSING APPARATUS

CROSS-REFERENCE TO RELATED APPLICATION

The present application claims priority to Japanese Patent Application No. 2021-111815 filed on Jul. 5, 2021, the entire contents of which are incorporated herein by reference.

TECHNICAL FIELD

The present disclosure relates to an information processing apparatus.

BACKGROUND

Technology for inspecting inspection targets using flying objects, including drones, is known. For example, patent literature (PTL) 1 discloses an inspection system that uses an imaging apparatus mounted on a flying object to acquire a plurality of still images of a surface to be inspected and performs predetermined analysis processing on the acquired still images to inspect the surface.

CITATION LIST

Patent Literature

PTL 1: JP 2021-022846 A

SUMMARY

An information processing apparatus according to an embodiment includes:
- an image acquisition interface configured to acquire a video of an inspection target from a flying object, the video having been taken by the flying object in flight;
- a memory storing a reference still image serving as a reference for analysis and a threshold of similarity between the reference still image and frames included in the acquired video; and
- an image extractor configured to calculate the similarity to the reference still image for each frame and extract a plurality of consecutive frames to be analyzed based on the similarity and the threshold.

BRIEF DESCRIPTION OF THE DRAWINGS

In the accompanying drawings:

FIG. 4 is a flowchart illustrating an example of operations of the information processing apparatus of FIG. 1;

FIG. 5 is a schematic diagram illustrating an example of processing by the information processing apparatus of FIG. 1 to extract a frame group;

DETAILED DESCRIPTION

Figure 1:
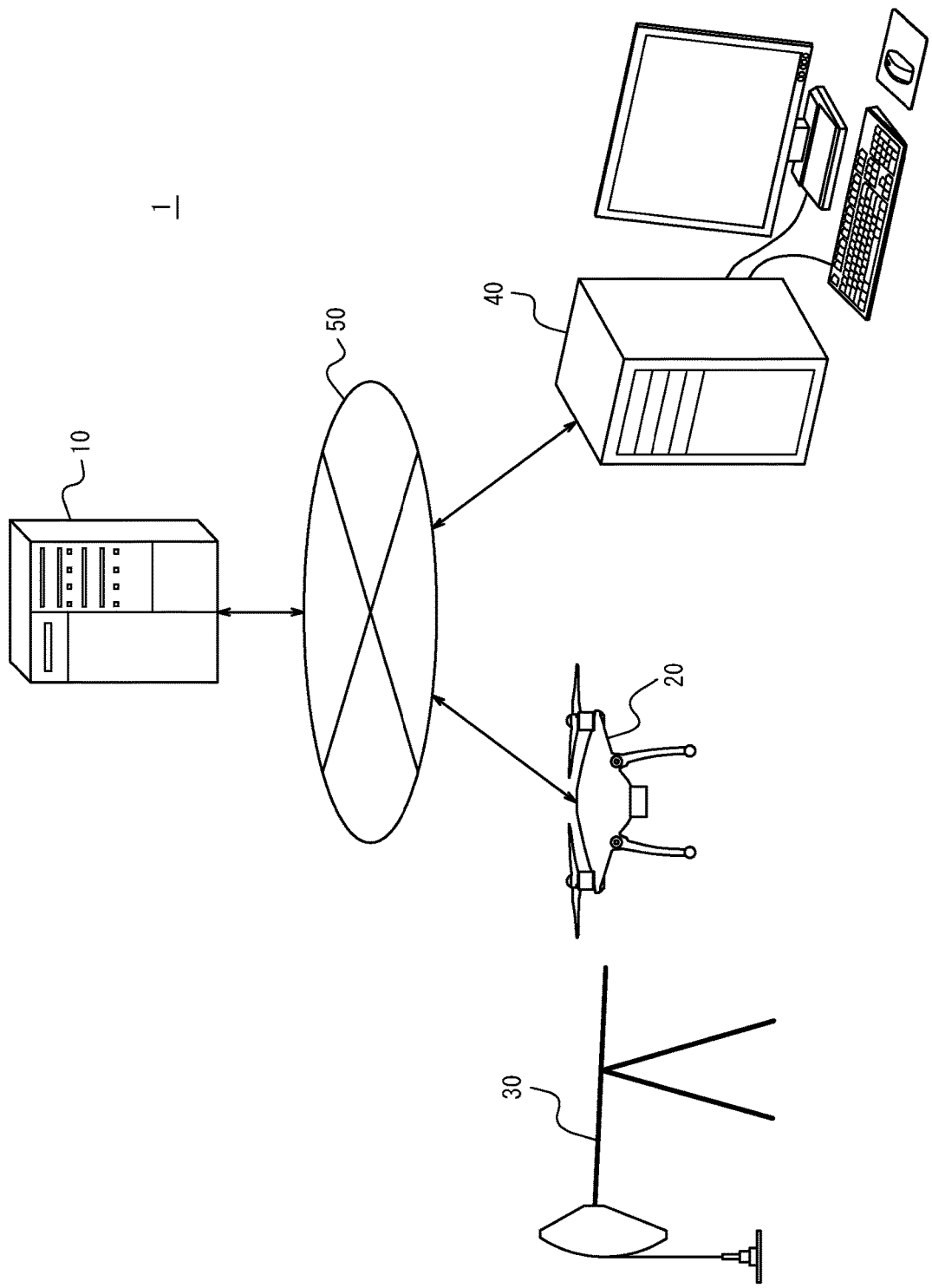
FIG. 1 is a diagram illustrating the configuration of an information processing system that includes an information processing apparatus according to an embodiment of the present disclosure.

When a camera on a flying object is used to capture video of an inspection target, the relative positions of the inspection target as the subject of imaging and the flying object change constantly. In other words, the coordinates and orientation of the subject continuously change from frame to frame in the video. If the frame interval to be inspected is the entire video, the analysis target will include intervals with significant image noise and intervals in which the subject is not captured accurately. The inspection accuracy when inspecting the inspection target based on the video will thus be significantly degraded.

It would be helpful to provide an information processing apparatus that can acquire images suitable for inspection from a series of captured images even when images of an inspection target are captured by a flying object in flight.

An information processing apparatus according to an embodiment includes:
- an image acquisition interface configured to acquire a video of an inspection target from a flying object, the video having been taken by the flying object in flight;
- a memory storing a reference still image serving as a reference for analysis and a threshold of similarity between the reference still image and frames included in the acquired video; and
- an image extractor configured to calculate the similarity to the reference still image for each frame and extract a plurality of consecutive frames to be analyzed based on the similarity and the threshold.

This enables the information processing apparatus to acquire images suitable for inspection from a series of captured images even when images of an inspection target are captured by a flying object in flight. The information processing apparatus can improve the inspection accuracy even when the relative positions of the flying object and the inspection target change. For example, the information processing apparatus can extract only the frame range that becomes the analysis target by extracting a plurality of consecutive frames from the video as the analysis target based on the similarity and the threshold. Therefore, in the case of inspecting a periodically operating inspection target using video of the inspection target captured by a flying object, image analysis can be performed while excluding the frames in sections with significant image noise and sections in which the subject is not captured accurately. Therefore, noise reduction is achieved by removing portions that are unnecessary for image analysis, thereby improving the accuracy when inspecting the inspection target.

In an embodiment, the image extractor may calculate an average value of the similarity of the plurality of consecutive frames while shifting the frames and extract a plurality of consecutive frames for which the calculated average value is equal to or greater than the threshold as the analysis target. This enables the information processing apparatus to extract a frame range with particularly high similarity in advance for use in subsequent image analysis. The accuracy when inspecting the inspection target is thereby further improved.

In an embodiment, the image extractor may perform a filtering process on the frame in a case in which the similarity is determined to be less than the threshold. By using a filtering process to remove various types of noise included in the data at the time of video capture, the information processing apparatus can improve the calculation accuracy during a process to recalculate the similarity.

In an embodiment, the information processing apparatus may further include an image analyzer configured to extract feature points from the frames and perform image processing on the frames so that positions of the extracted feature points match in the plurality of consecutive frames. This enables the information processing apparatus to perform image generation processing that virtually fixes the camera viewpoint with respect to the acquired video data. As a result, changes in operation of the inspection target can be accurately captured even when the relative positions of the flying object and the inspection target are constantly changing. The accuracy when inspecting the inspection target is thereby further improved.

In an embodiment, the image analyzer may calculate an operating frequency of the inspection target from the plurality of consecutive frames subjected to the image processing. In this way, the information processing apparatus can provide an index for determining whether the operation of the periodically operating inspection target is abnormal. By determining whether the inspection target exhibits periodicity, the information processing apparatus can accurately identify non-operation of an inspection target that is not operating and can accurately identify angle changes for an inspection target that is operating.

In an embodiment, the memory may store a threshold range of the operating frequency, and the information processing apparatus may further include an abnormality determination unit configured to determine that the operation of the inspection target is abnormal in a case in which the operating frequency is outside the threshold range. This enables the information processing apparatus to uniquely and automatically determine whether the inspection target that becomes the analysis target is normal or abnormal using a threshold range set by a user.

In an embodiment, the memory may store a distance threshold range indicating a range of distances between the flying object and the inspection target, and the information processing apparatus may further include a position adjuster configured to displace the flying object so that a distance acquired from the flying object falls within the distance threshold range in a case in which the distance is outside the distance threshold range. This enables the information processing apparatus to control the flying object to capture video only when the inspection target is located within the field of view of the camera. Therefore, the information processing apparatus can acquire only such video, which improves the accuracy when inspecting the inspection target.

According to the present disclosure, an information processing apparatus that can acquire images suitable for inspection from a series of captured images, even when images of an inspection target are captured by a flying object in flight, can be provided.

The background and problems with conventional technology are described in greater detail.

During inspections for abnormalities in oil well pumps located throughout the country, almost all oil well pumps are visually inspected by human inspectors. This leads to high labor costs. To solve this problem, an unmanned flying object such as a drone may be used to capture images of oil well pumps that operate periodically, and the rotation speed of the pumps may be calculated based on the obtained video. An application that can thereby detect abnormalities in oil well pumps and analyze oil production conditions is in the development stage.

Oil well pumps are structured to operate periodically. Therefore, an abnormality in an oil well pump and the amount of oil produced can be calculated from the cycle of the oil well pump. The above application is based on this principle.

When a camera on an unmanned flying object such as a drone is used to capture video of an oil well pump, the relative positions of the oil well pump as the subject of imaging and the unmanned flying object change constantly. In other words, the coordinates and orientation of the subject continuously change from frame to frame in the video. If the frame interval to be inspected is the entire video, the analysis target will include intervals with significant image noise and intervals in which the subject is not captured accurately. The inspection accuracy when inspecting the oil well pump based on the video will thus be significantly degraded. Therefore, it is desirable to perform the analysis after excluding the frames of such intervals that are not appropriate as the analysis target.

The inspection system described in PTL 1 controls the flight status of the flying object and the image capturing status of the imaging apparatus to acquire a plurality of still images of the surface to be inspected at an image capturing altitude determined based on the size and number of pixels of the imaging sensor provided in the image capturing apparatus of the drone and the focal length of the image capturing apparatus. This makes it possible to efficiently and effectively inspect a predetermined surface.

However, this conventional technology does not sufficiently take into account the fact that the relative positions of the flying object and the inspection target change when analysis processing is performed on the images captured by the flying object. It is therefore difficult to obtain sufficient inspection accuracy when the inspection target is inspected by the flying object.

An information processing apparatus, an information processing system, and an information processing method that can solve these problems are described below. Embodiments of the present disclosure are described with reference to the drawings.

FIG. 1 is a diagram illustrating the configuration of an information processing system 1 that includes an information processing apparatus 10 according to an embodiment of the present disclosure. An overview of the information processing system 1 including the information processing apparatus 10 according to an embodiment of the present disclosure is mainly described with reference to FIG. 1. In addition to the information processing apparatus 10, the information processing system 1 includes a flying object 20 and a terminal apparatus 40. The information processing apparatus 10, the flying object 20, and the terminal apparatus 40 are communicably connected to a network 50, such as a mobile communication network and/or the Internet.

The information processing apparatus 10 is, for example, one server apparatus or a plurality of communicably connected server apparatuses.

The flying object 20 is, for example, any flying object without a human passenger. The flying object 20 includes, for example, drones and multicopters. The flying object 20 can fly by autonomous control or in cooperation with the information processing apparatus 10. The flying object 20 is used to capture video of the periodically operating oil well pump 30 from the sky and inspect the oil well pump 30 for any abnormalities.

The terminal apparatus 40 is a general purpose electronic device, such as a personal computer (PC) or a smartphone.

The terminal apparatus 40 is, for example, an electronic device managed by a user who inspects the oil well pump 30 for any abnormalities.

Figure 2:
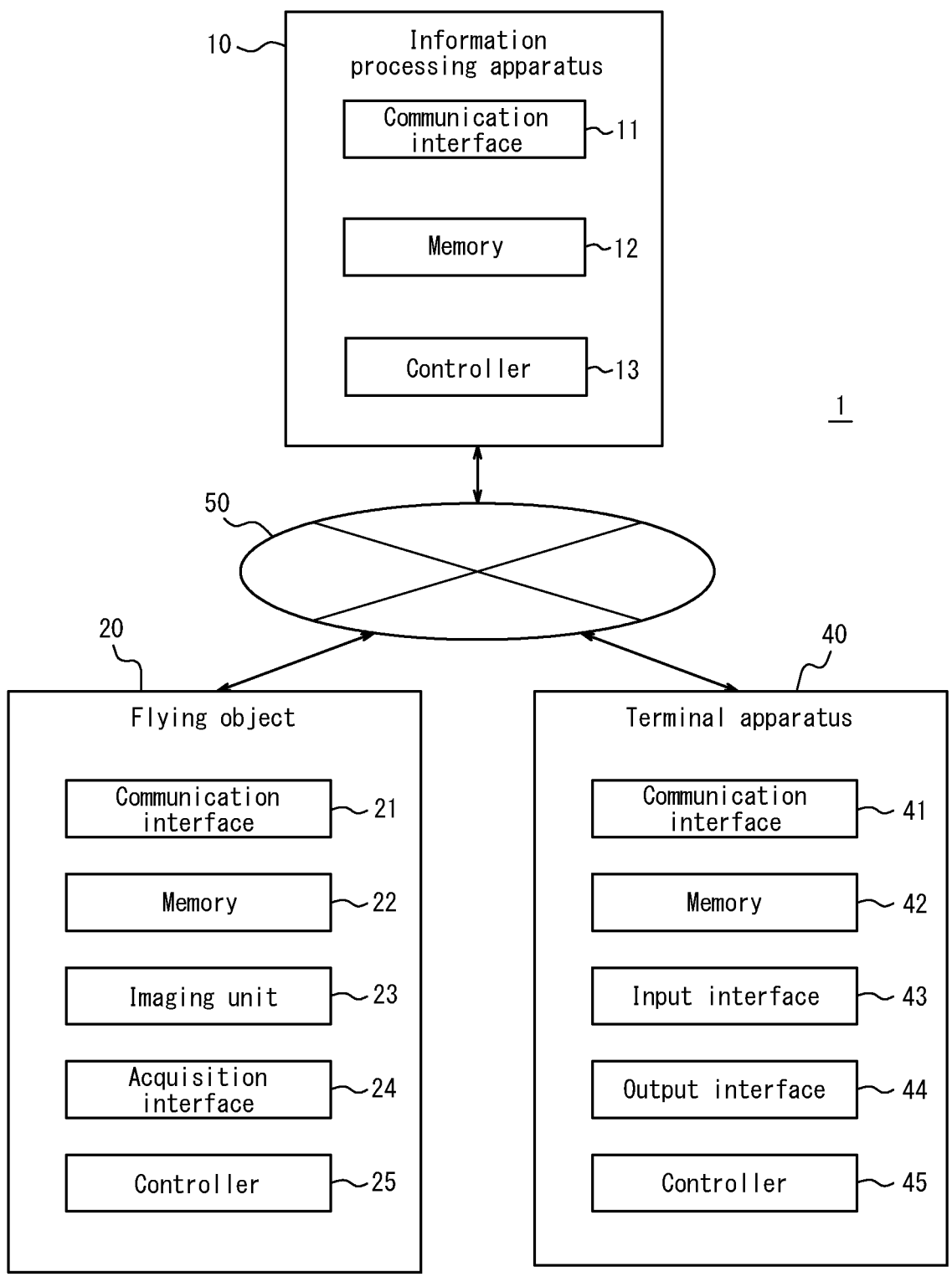
FIG. 2 is a functional block diagram schematically illustrating configurations of the information processing apparatus of FIG. 1, a flying object, and a terminal apparatus.

FIG. 2 is a functional block diagram schematically illustrating configurations of the information processing apparatus 10, the flying object 20, and the terminal apparatus 40 in FIG. 1. The configurations of the information processing apparatus 10, the flying object 20, and the terminal apparatus 40 included in the information processing system 1 are mainly described with reference to FIG. 2.

As illustrated in FIG. 2, the information processing apparatus 10 includes a communication interface 11, a memory 12, and a controller 13.

The communication interface 11 includes a communication module that connects to the network 50. For example, the communication interface 11 includes a communication module compatible with mobile communication standards such as 4th Generation (4G) and 5th Generation (5G) or Internet standards. In an embodiment, the information processing apparatus 10 is connected to the network 50 via the communication interface 11. The communication interface 11 transmits and receives various information via the network 50.

The memory 12 includes any storage module, such as a hard disk drive (HDD), a solid state drive (SSD), an electrically erasable programmable read-only memory (EEPROM), a read-only memory (ROM), and a random access memory (RAM). The memory 12 stores information necessary to realize the operations of the information processing apparatus 10. For example, the memory 12 stores firmware necessary to realize the operations of the information processing apparatus 10. The memory 12 functions as a main memory, an auxiliary memory, or a cache memory.

The controller 13 includes one or more processors. More specifically, the controller 13 includes a general purpose processor or a processor dedicated to a specific process. The controller 13 is connected to each component configuring the information processing apparatus 10 and controls and manages the information processing apparatus 10 overall, starting with the components thereof.

Next, the configuration of the flying object 20 included in the information processing system 1 will be mainly described. As illustrated in FIG. 2, the flying object 20 includes a communication interface 21, a memory 22, an imaging unit 23, an acquisition interface 24, and a controller 25.

The communication interface 21 includes a communication module that connects to the network 50. For example, the communication interface 21 includes a communication module compliant with a mobile communication standard such as 4G or 5G. In an embodiment, the flying object 20 is connected to the network 50 via the communication interface 21. The communication interface 21 transmits and receives various information via the network 50.

The memory 22 includes any appropriate storage module, such as an HDD, SSD, EEPROM, ROM, or RAM. The memory 22 stores information necessary to realize the operations of the flying object 20. For example, the memory 22 stores firmware necessary to realize the operations of the flying object 20. The memory 22 functions as a main memory, an auxiliary memory, or a cache memory.

The imaging unit 23 includes any imaging apparatus capable of capturing images of the inspection target from above, for example. The imaging unit 23 includes a camera, for example.

The acquisition interface 24 includes one or more receivers corresponding to any satellite positioning system. For example, the acquisition interface 24 includes a Global Positioning System (GPS) receiver. Additionally, the acquisition interface 24 includes an altimeter. The acquisition interface 24 acquires measurements of the position of the flying object 20 as positional information. The positional information includes, for example, latitude, longitude, and altitude. The acquisition interface 24 acquires the positional information for the flying object 20 continuously or on a regular or irregular basis.

The controller 25 includes one or more processors. More specifically, the controller 25 includes a general purpose processor or a processor dedicated to a specific process. The controller 25 is connected to each component configuring the flying object 20 and controls and manages the flying object 20 overall, starting with the components thereof.

Next, the configuration of the terminal apparatus 40 included in the information processing system 1 will be mainly described. As illustrated in FIG. 2, the terminal apparatus 40 includes a communication interface 41, a memory 42, an input interface 43, an output interface 44, and a controller 45.

The communication interface 41 includes a communication module that connects to the network 50. For example, the communication interface 41 includes a communication module compliant with a mobile communication standard, such as 4G or 5G, or Internet standards. In an embodiment, the terminal apparatus 40 is connected to the network 50 via the communication interface 41. The communication interface 41 transmits and receives various information via the network 50.

The memory 42 includes any appropriate storage module, such as an HDD, SSD, EEPROM, ROM, or RAM. The memory 42 stores information necessary to realize the operations of the terminal apparatus 40. For example, the memory 42 stores firmware necessary to realize the operations of the terminal apparatus 40. The memory 42 functions as a main memory, an auxiliary memory, or a cache memory.

The input interface 43 includes one or more interfaces for input to detect user input and acquire input information based on user operations. For example, the input interface 43 may be a physical key, a capacitive key, a touchscreen provided integrally with a display of the output interface 44, a microphone that receives audio input, or the like.

The output interface 44 includes one or more interfaces for output to output information and notify the user. For example, the output interface 44 includes a display that outputs information as images, a speaker that outputs information as audio, or the like.

The controller 45 includes one or more processors. More specifically, the controller 45 includes a general purpose processor or a processor dedicated to a specific process. The controller 45 is connected to each component configuring the terminal apparatus 40 and controls and manages the terminal apparatus 40 overall, starting with the components thereof.

The functions of the information processing system 1 are mainly described below.

To inspect an oil well pump 30 installed at a predetermined point, the information processing apparatus 10 selects a predetermined flying object 20 located near the predetermined point. The flying object 20 moves to the predetermined point and captures video of the oil well pump 30 installed at the predetermined point. Subsequently, the flying object 20 transmits the captured images of the periodically operating oil well pump 30 as data to the information processing apparatus 10 via the network 50.

As an overview of an embodiment, the information processing apparatus 10 acquires video of the inspection target from the flying object 20, the video having been taken by the flying object in flight. The information processing apparatus 10 stores a reference still image serving as a reference for analysis and a threshold of similarity between the reference still image and frames included in the acquired video, i.e., the threshold described below. The information processing apparatus 10 calculates the similarity with the reference still image for each frame. The information processing apparatus 10 extracts a plurality of consecutive frames as an analysis target based on the calculated similarity and the threshold.

In the present description, the "inspection target" includes, for example, the oil well pump 30. The "image" includes, for example, video and a plurality of still images.

Figure 3:
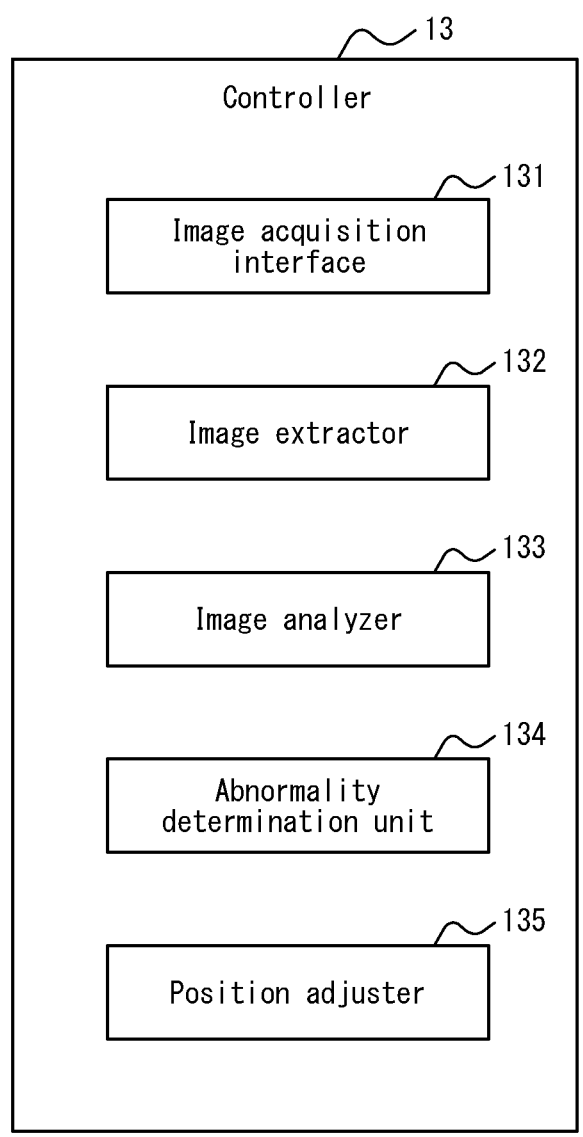
FIG. 3 is a functional block diagram illustrating an example of functions achieved by a controller in the information processing apparatus of FIG. 2.

FIG. 3 is a functional block diagram illustrating an example of functions achieved by the controller 13 in the information processing apparatus 10 of FIG. 2. With reference to FIG. 3, an example of each functional component included in the controller 13 is explained in more detail.

The controller 13 includes an image acquisition interface 131, an image extractor 132, an image analyzer 133, an abnormality determination unit 134, and a position adjuster 135. The image acquisition interface 131 acquires video, captured by the imaging unit 23 of the flying object 20, of the periodically operating inspection target from the flying object 20 via the network 50 and the communication interface 11. The image acquisition interface 131 acquires, from the flying object 20, the video captured by the camera of the imaging unit 23 while the relative positions of the inspection target as the subject of imaging and the flying object 20 change.

The image extractor 132 extracts the frame range that becomes the analysis target from the video data acquired by the image acquisition interface 131. The image extractor 132 extracts only the frame range to be used for image analysis in the next process from the video data acquired by the image acquisition interface 131.

The image analyzer 133 performs image analysis based on the frame range extracted by the image extractor 132. The image analyzer 133 performs image generation processing, that virtually fixes the camera viewpoint with respect to the acquired video data, and calculates the number of revolutions per unit time from the amount of change in pixel values of the inspection target per unit time when the inspection target is viewed from the fixed viewpoint.

The abnormality determination unit 134 determines whether the inspection target exhibits an abnormality based on the result of image analysis by the image analyzer 133. The abnormality determination unit 134 compares the number of revolutions per unit time calculated by the image analyzer 133 with a threshold range, described below, stored in advance in the memory 12 and notifies the user.

The position adjuster 135 displaces the flying object 20 so that the distance, acquired from the flying object 20, between the flying object 20 and the inspection target is within a distance threshold range, described below, in a case in which the distance is outside the distance threshold range.

FIG. 4 is a flowchart illustrating an example of operations of the information processing apparatus 10 in FIG. 1. An example of a method of an information processing method performed by the information processing apparatus 10 is mainly described with reference to FIG. 4.

In step S100, the position adjuster 135 of the controller 13 in the information processing apparatus 10 determines whether the distance between the flying object 20, equipped with a camera as the imaging unit 23, and the inspection target is within a distance threshold range.

In the present description, the "distance threshold range" includes, for example, any appropriate range regarding distances between the flying object 20 and the inspection target that enable accurate calculation of similarity, described below, based on the performance of the camera forming the imaging unit 23 of the flying object 20. The distance threshold range is the range of distances between the flying object 20 and the inspection target when the reference still image, described below, is captured. The user sets the distance threshold range. The controller 13 stores the distance threshold range set by the user in the memory 12 in advance. The memory 12 stores the distance threshold range indicating a range of distances between the flying object 20 and the inspection target.

The controller 13 receives the positional information acquired by the acquisition interface 24 of the flying object 20 from the flying object 20 via the network 50 and the communication interface 11. The controller 13 compares the acquired positional information with the positional information for the inspection target stored in advance in the memory 12 to calculate the distance between the flying object 20 and the inspection target.

Upon determining that the distance between the flying object 20 and the inspection target is within the distance threshold range (Step S100: Yes), the controller 13 performs the process of step S102. Upon determining that the distance between the flying object 20 and the inspection target is not within the distance threshold range (Step S100: No), the controller 13 performs the process of step S101.

When the position adjuster 135 of the controller 13 determines in step S100 that the distance between the flying object 20 and the inspection target is not within the distance threshold range (Step S100: No), in step S101, the position adjuster 135 displaces the flying object 20 so that the distance is within the distance threshold range. More specifically, the position adjuster 135 generates control information to control the movement of the flying object 20 and transmits the control information to the flying object 20 via the communication interface 11 and the network 50.

When the position adjuster 135 determines in step S100 that the distance between the flying object 20 and the inspection target is within the distance threshold range (Step S100: Yes), in step S102, the image acquisition interface 131 of the controller 13 acquires video of the inspection target from the flying object 20 via the network 50 and the communication interface 11, the video having been taken by the flying object 20 in flight.

In step S103, the image extractor 132 of the controller 13 calculates, for each frame, the similarity between the frames included in the video acquired by the image acquisition interface 131 in step S102 and the reference still image serving as a reference for analysis. In the present description, the "reference still image" includes, for example, a still image of an inspection target captured in advance by the imaging unit 23 of the flying object 20. The controller 13 acquires the reference still image of the inspection target from the flying object 20 in advance via the network 50 and the communication interface 11. The controller 13 stores the acquired reference still image in advance in the memory 12 as image data. The memory 12 stores the reference still image serving as a reference for analysis. When performing the process of step S103, the image extractor 132 refers to the reference still image stored by the memory 12.

For example, the image extractor 132 compares the luminance values of the corresponding pixels between a frame included in the video and the reference still image. At this time, the luminance values are determined based on binarization or a grayscale. The image extractor 132 calculates a higher similarity as the luminance values for corresponding pixels are nearer each other throughout.

In step S104, the image extractor 132 determines whether a predetermined condition is met for the frames included in the video acquired by the image acquisition interface 131 in step S102. In an embodiment, the "predetermined condition" is that the average value of similarity calculated by the image extractor 132 for each consecutive frame within a predetermined time is equal to or greater than a threshold. The image extractor 132 determines whether the average value of the similarity calculated for each consecutive frame within the predetermined time in the similarity calculation process in step S103 is equal to or greater than the threshold. In the present description, the "threshold" is appropriately determined by the user and stored in the memory 12 in advance by the controller 13. The memory 12 stores the threshold of similarity between the reference still image and frames included in the video.

Upon determining that the average value of the similarity is equal to or greater than the threshold (step S104: Yes), the image extractor 132 performs the process of step S106. Upon determining that the average value of the similarity is less than the threshold (step S104: No), the image extractor 132 performs the process of step S105.

In step S105, the image extractor 132 performs a filtering process on the frame in a case in which the similarity is determined to be less than the threshold. More specifically, when the image extractor 132 determines in step S104 that the predetermined condition is not met, i.e., that the average value of similarity is smaller than the threshold, the image extractor 132 performs a filtering process on the data of the image. In the present description, the "filtering process" includes, for example, an image smoothing process using a median filter, a Gaussian filter, an averaging filter, and the like, which are effective when image noise is large. The filtering process also includes edge enhancement processing using a Laplacian filter, a Sobel filter, and the like, which are effective when the contrast of the image including the inspection target is low.

In step S106, the image extractor 132 extracts a plurality of consecutive frames as an analysis target based on the calculated similarity and the threshold. More specifically, the image extractor 132 extracts, from a series of frames of the acquired video, a group of frames that are consecutive and for which the average value of similarity to the reference still image is equal to or greater than the threshold as the analysis target.

In this way, the image extractor 132 extracts consecutive frames, as a frame group, included in the video acquired by the image acquisition interface in step S102.

In step S107, the image analyzer 133 of the controller 13 performs image analysis based on the frame group extracted by the image extractor 132 in step S106. At this time, the image analyzer 133 extracts feature points from each frame included in the frame group extracted from the video by the image extractor 132 in step S106 and performs image processing on the frames so that the positions of the extracted feature points match in a plurality of consecutive frames. The image processing includes rotation and trapezoidal correction.

The image analyzer 133 calculates an operating frequency of the inspection target from the plurality of consecutive frames subjected to the image processing. More specifically, the image analyzer 133 determines whether the inspection target exhibits periodicity based on the frame group extracted by the image extractor 132 in step S106. Upon determining that the inspection target exhibits periodicity, the image analyzer 133 calculates the operating frequency of the inspection target by analyzing pixel changes in the inspection target over periods of time. By determining whether the inspection target exhibits periodicity, the image analyzer 133 can accurately identify non-operation of an inspection target that is not operating and can accurately identify angle changes for an inspection target that is operating.

In step S108, the abnormality determination unit 134 of the controller 13 determines whether the inspection target exhibits an abnormality based on the result of image analysis by the image analyzer 133 in step S107. The abnormality determination unit 134 determines that operations of the inspection target are abnormal in a case in which the operating frequency calculated by the image analyzer 133 in step S107 is outside the threshold range of the operating frequency stored by the memory 12. In the present description, the "threshold range" is appropriately determined by the user and stored in the memory 12 in advance by the controller 13. In determining whether the inspection target to be analyzed is normal or abnormal, the abnormality determination unit 134 determines that the inspection target is normal if the operating frequency is within the threshold range set by the user and determines that the inspection target is abnormal if the operating frequency is outside the threshold range.

In step S109, the abnormality determination unit 134 notifies the user of the result of the abnormality determination in step S108. The abnormality determination unit 134 transmits the result of the abnormality determination to the user's terminal apparatus 40, which is communicably connected to the network 50. The user confirms the result of the abnormality determination while viewing a screen displayed by the output interface 44 of the user's terminal apparatus 40. The user similarly confirms the result of the mechanical determination of abnormality by the information processing apparatus 10. Therefore, a double-check function is achieved with respect to the abnormality determination, and the user can also update the threshold range for abnormality determination as appropriate.

FIG. 5 is a schematic diagram illustrating an example of processing by the information processing apparatus 10 of FIG. 1 to extract a frame group. An example of the above-described processing, performed by the image extractor 132, to extract a frame group in step S106 is described in detail with reference to FIG. 5.

The image extractor 132 calculates the similarity between the reference still image and the frames included in the image for the entire frame region in the image. The image extractor 132 calculates the average value of the similarity for a plurality of consecutive frames while shifting the frames. The image extractor 132 determines whether the average value of the calculated similarity for the plurality of frames included in a predetermined period of t seconds is equal to or greater than a threshold. The image extractor 132 extracts a plurality of consecutive frames in the predetermined t seconds for which the calculated average value is equal to or greater than the threshold as the analysis target from the video acquired by the image acquisition interface 131 in step S102. In this way, the image extractor 132 extracts a frame group included in the predetermined t seconds for which the average value of similarity is high as the analysis target.

TABLE 1

| Time (s) | Similarity |
|---|---|
| 0 to t | 0.553 |
| 1 to 1 + t | 0.551 |
| ... | ... |
| α to α + t | 0.701 |
| ... | ... |

Table 1 illustrates an example, for each frame interval of t seconds, of the average value of the similarity calculated by the image extractor 132 for a plurality of frames included in the predetermined t seconds. As illustrated in FIG. 5 and Table 1, the average value of the similarity of the plurality of frames included in the video between 0 and t seconds is assumed to be 0.553. The average value of the similarity of the plurality of frames included in the video between 1 and 1+t seconds is assumed to be 0.551. The average value of the similarity of the plurality of frames included in the video between α and α+t seconds is assumed to be 0.701. When the threshold is set to 0.7, the frame group that is included in the video between α and α+t seconds and is equal to or greater than the threshold is extracted as the analysis target.

Figure 6A:
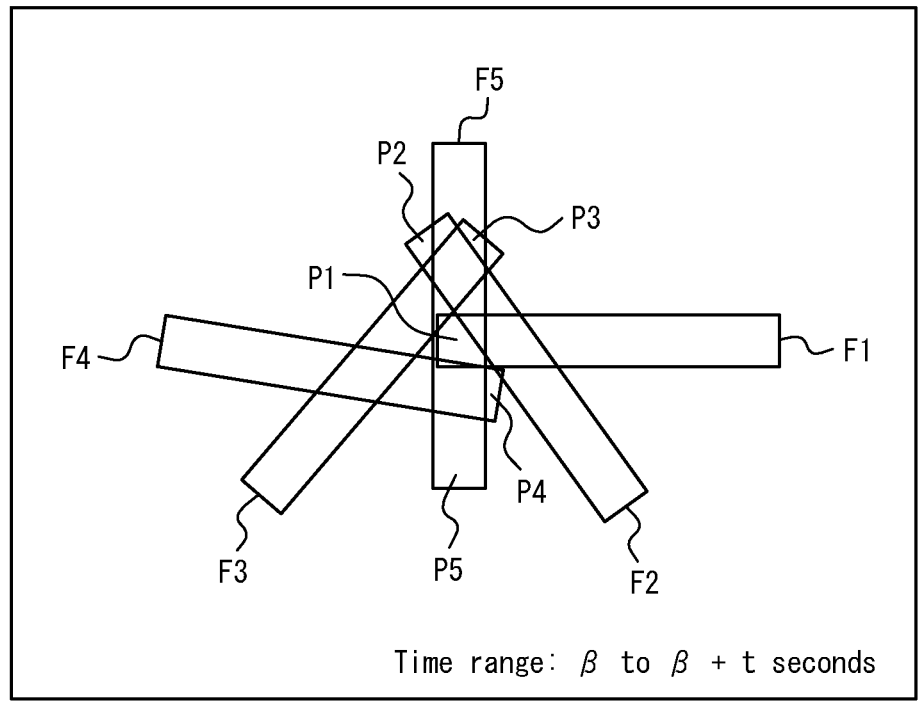
FIG. 6A is a first schematic diagram illustrating an example of image processing by the information processing apparatus of FIG. 1.
Figure 6B:
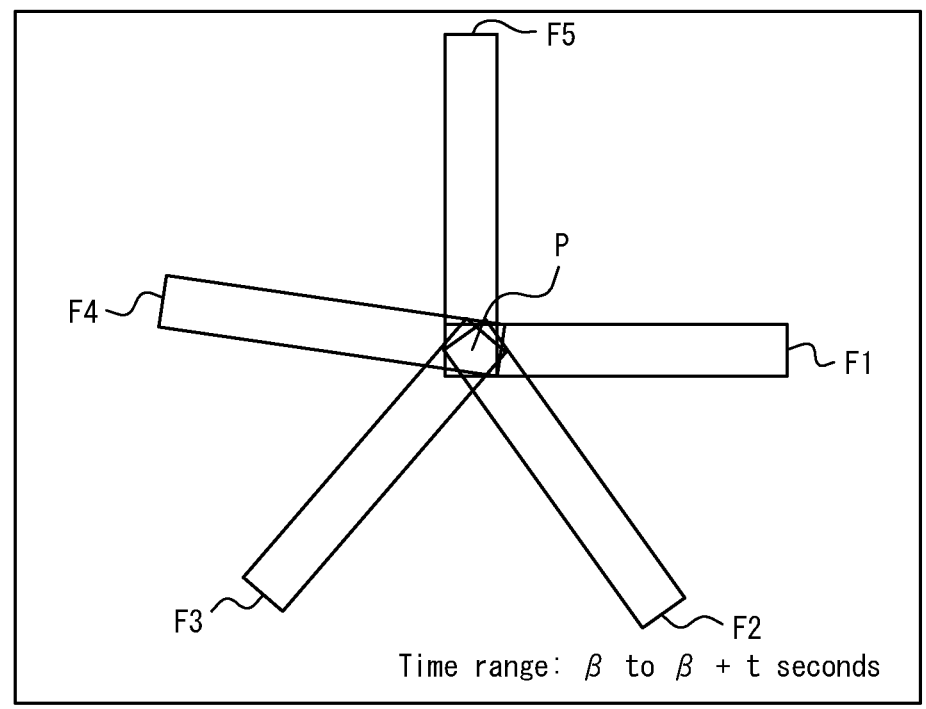
FIG. 6B is a second schematic diagram illustrating an example of image processing by the information processing apparatus of FIG. 1.

FIG. 6A is a first schematic diagram illustrating an example of image processing by the information processing apparatus 10 of FIG. 1. FIG. 6B is a second schematic diagram illustrating an example of image processing by the information processing apparatus 10 of FIG. 1. An example of preprocessing, performed by the image analyzer 133, for the image analysis of step S107, described above, is explained in detail with reference to FIGS. 6A and 6B.

FIGS. 6A and 6B schematically illustrate a moving part of a periodically operating inspection target imaged from the sky by the flying object 20. FIG. 6A illustrates the case of the aforementioned preprocessing not having been performed on the captured video of the periodically operating inspection target. FIG. 6B illustrates the case of the aforementioned preprocessing having been performed on the captured video of the periodically operating inspection target.

For example, the image analyzer 133 performs image processing as the preprocessing on each frame so that feature points P (P1 to P5) of each frame extracted from the video by the image extractor 132 in step S106, described above, match each other.

Normally, the relative positions of the inspection target and the flying object 20 change continuously, and the relative positions of the camera forming the imaging unit 23 of the flying object 20 and the inspection target also change continuously. Therefore, when the camera captures images of the periodically operating inspection target, the moving part of the inspection target in each frame of the video are displayed within each frame with the feature points P shifted from one to another, as illustrated in FIG. 6A.

In the first frame, the feature point P1 of a moving part F1 of the inspection target is at the position illustrated in FIG. 6A. In the second frame, the feature point P2 of a moving part F2 of the inspection target is at the position illustrated in FIG. 6A. In the third frame, the feature point P3 of a moving part F3 of the inspection target is at the position illustrated in FIG. 6A. In the fourth frame, the feature point P4 of a moving part F4 of the inspection target is at the position illustrated in FIG. 6A. In the fifth frame, the feature point P5 of a moving part F5 of the inspection target is at the position illustrated in FIG. 6A. As described above, the position of each feature point P is different in each frame.

As illustrated in FIG. 6B, the image analyzer 133 matches the feature points P of each frame with each other by performing image processing, including rotation and trapezoidal correction, on the video as illustrated in FIG. 6A. Furthermore, the image analyzer 133 detects the operating frequency of the inspection target based on the frame group with matched feature points P. In the video in FIG. 6B, the user recognizes the inspection target as though the relative position of the flying object 20 to the inspection target were constant, and the user can easily see the periodic operation of the moving part of the inspection target.

The controller 13 displays, on the user's terminal apparatus 40, the frame group that is included in the video acquired by the image acquisition interface 131 in step S102, described above, and that satisfies a predetermined condition. The controller 13 displays the video subjected to image processing, as illustrated in FIG. 6B, on the output interface 44 of the terminal apparatus 40 as a user interface. At this time, as illustrated in FIG. 6B, the controller 13 also displays the start time and end time of extraction of the frame group from the video acquired by the image acquisition interface 131 in step S102 to display the frame group together with the time range during which the frame group was extracted on the output interface 44 of the terminal apparatus 40.

According to the above embodiment, images suitable for inspection can be acquired from a series of captured images even when images of the inspection target are captured by the flying object 20 in flight. The information processing apparatus 10 can improve the inspection accuracy even when the relative positions of the flying object 20 and the inspection target change. For example, the information processing apparatus 10 can extract only the frame range that becomes the analysis target by extracting a plurality of consecutive frames from the video as the analysis target based on the similarity and the threshold. Therefore, in the case of inspecting a periodically operating inspection target using video of the inspection target captured by the flying object 20, image analysis can be performed while excluding the frames in sections with significant image noise and sections in which the subject is not captured accurately. Therefore, noise reduction is achieved by removing portions that are unnecessary for image analysis, thereby improving the accuracy when inspecting the inspection target.

By acquiring video upon determining that the distance between the flying object 20 and the inspection target is within the distance threshold range, the information processing apparatus 10 can acquire video only when the inspection target is located within the field of view of the camera. The accuracy when inspecting the inspection target is thereby improved.

By extracting a frame group composed of consecutive frames included in the acquired video, the information processing apparatus 10 can use, in subsequent image analysis, video that captures the continuous change in the periodic operation of the inspection target. The accuracy when inspecting the inspection target is thereby further improved.

By selecting an extraction range for extracting a frame group from the video based on the calculated similarity, the information processing apparatus 10 can extract a range of frames similar to the reference still image in advance for use in subsequent image analysis. The accuracy when inspecting the inspection target is thereby further improved.

By extracting a plurality of consecutive frames for which the average value of the calculated similarity is equal to or greater than a threshold as the analysis target, the information processing apparatus 10 can extract a range of frames with a particularly high similarity in advance for use in subsequent image analysis. The accuracy when inspecting the inspection target is thereby further improved.

The information processing apparatus 10 performs a filtering process on the frame upon determining that the similarity is less than the threshold. By using a filtering process to remove various types of noise included in the data at the time of video capture, the information processing apparatus 10 can improve the calculation accuracy during a process to recalculate the similarity.

By extracting feature points from frames and performing image processing on the frames so that the positions of the extracted feature points match in a plurality of consecutive frames, the information processing apparatus 10 can perform image generation processing that virtually fixes the camera viewpoint with respect to the acquired video data. As a result, changes in operation of the inspection target can be accurately captured even when the relative positions of the flying object 20 and the inspection target are constantly changing. The accuracy when inspecting the inspection target is thereby further improved.

By calculating the operating frequency of the inspection target from a plurality of consecutive frames subjected to image processing, the information processing apparatus 10 can provide an index for determining whether the operation of the periodically operating inspection target is abnormal. By determining whether the inspection target exhibits periodicity, the information processing apparatus 10 can accurately identify non-operation of an inspection target that is not operating and can accurately identify angle changes for an inspection target that is operating.

The information processing apparatus 10 determines that the operation of the inspection target is abnormal in a case in which the operating frequency is outside the threshold range. This enables the information processing apparatus 10 to uniquely and automatically determine whether the inspection target that becomes the analysis target is normal or abnormal using a threshold range set by a user.

In a case in which the distance between the flying object 20 and the inspection target is outside the distance threshold range, the information processing apparatus 10 displaces the flying object so that the distance is within the distance threshold range. The flying object 20 can thus be caused to capture video only when the inspection target is located within the field of view of the camera. Therefore, the information processing apparatus 10 can acquire only such video, thereby improving the accuracy when inspecting the inspection target.

According to the above embodiment, images suitable for inspection can be acquired from a series of captured images even when images of the inspection target are captured by the flying object 20 in flight. The information processing apparatus 10 can improve the inspection accuracy even when the relative positions of the flying object 20 and the inspection target change. For example, the information processing apparatus 10 can display only the frame range that becomes the analysis target by displaying, on the user's terminal apparatus 40, a plurality of consecutive frames based on the similarity and the threshold. Therefore, in the case of inspecting a periodically operating inspection target using video of the inspection target captured by the flying object 20, image analysis can be performed while excluding the frames in sections with significant image noise and sections in which the subject is not captured accurately. Therefore, noise reduction is achieved by removing portions that are unnecessary for image analysis, thereby improving the accuracy when inspecting the inspection target. When some sort of abnormality is discovered in the inspection target, the user can easily check the operation status of the inspection target by viewing the user interface, as illustrated in FIG. 6B.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

The above-described steps in the operations of the information processing apparatus 10 and the functions and the like included in each step may be rearranged in any logically consistent way. The order of steps may be changed, steps may be combined, and individual steps may be divided.

The present disclosure may also be embodied as a program containing a description of the processing for achieving the functions of the above-described information processing apparatus 10 or a storage medium with the program recorded thereon. Such embodiments are also to be understood as falling within the scope of the present disclosure.

At least a portion of the processing operations performed by the information processing apparatus 10 according to one of the above embodiments may be performed by the flying object 20 and/or the terminal apparatus 40. For example, instead of the information processing apparatus 10, the flying object 20 itself may perform the above-described processing operations related to the information processing apparatus 10. At least a portion of the processing operations performed by the flying object 20 or the terminal apparatus 40 may be performed by the information processing apparatus 10.

The information processing apparatus 10 described in the above embodiments may be mounted in the flying object 20. At this time, the information processing apparatus 10 may communicate information directly with the flying object 20 without going through the network 50. For example, the amount of communication traffic on the network 50 can be reduced by inclusion of the image extractor 132 in the flying object 20. The present disclosure can therefore be implemented in outdoor environments with a narrow communication band, environments with restrictions on the communication frequency, and the like. Conversely, inclusion of the image extractor 132 in the information processing apparatus 10 configured as a server on the network 50 leads to effects such as a reduction in the processing load on the flying object 20 for calculation, a reduction in weight and cost of the flying object 20, and increased flight time due to reduced power consumption.

In FIG. 1, only one each of the information processing apparatus 10, the flying object 20, the oil well pump 30, and the terminal apparatus 40 are illustrated for the sake of simplicity, but the information processing system 1 may include two or more of each of the information processing apparatus 10, the flying object 20, the terminal apparatus 40, and the oil well pump 30.

The information processing apparatus 10 is not limited to one server apparatus or a plurality of server apparatuses that can communicate with each other and may also be any general purpose electronic device, such as a PC or smartphone, or another electronic device dedicated to the information processing system 1.

The terminal apparatus 40 is not limited to a general purpose electronic device, such as a PC or smartphone, and may also be one server apparatus managed by the user or a plurality of such server apparatuses that can communicate with each other, or another electronic device dedicated to the information processing system 1.

The memory 12 is not limited to being internal to the information processing apparatus 10 and may include an external storage module connected through a digital input/output port or the like, such as universal serial bus (USB).

The memory 22 is not limited to being internal to the flying object 20 and may include an external storage module connected through a digital input/output port or the like, such as USB.

The memory 42 is not limited to being internal to the terminal apparatus 40 and may include an external storage module connected through a digital input/output port or the like, such as USB.

The image extractor 132 may calculate the similarity by comparing the difference in luminance values of neighboring pixels between the frames included in the video and the reference still image. The image extractor 132 may also calculate the similarity based on machine learning. For example, the image extractor 132 may calculate the similarity by extracting several feature points from the reference still image and determining whether the feature points are included in the frames included in the video. The image extractor 132 may calculate a higher similarity as the number of matching feature points is greater.

In the above embodiment, the information processing apparatus 10 has been described as acquiring video upon determining that the distance between the flying object 20 and the inspection target is within the distance threshold range, but this configuration is not limiting. The information processing apparatus 10 may perform the process of acquiring video as in step S102 without performing the determination process as in step S100 of FIG. 4.

In the above embodiment, the information processing apparatus 10 has been described as extracting continuous frames included in the acquired video as a frame group, but this configuration is not limiting. The information processing apparatus 10 may extract a frame group that includes a plurality of discrete frames from the video.

In the above embodiment, the information processing apparatus 10 has been described as selecting an extraction range for extracting a frame group from the video based on the calculated similarity, but this configuration is not limiting. The controller 13 of the information processing apparatus 10 may calculate the relative positions of the flying object 20 and the inspection target and select an extraction range for extracting a frame group from the video based on the calculated relative positions in addition to or instead of the similarity. For example, the controller 13 may select, as the extraction range, the range of frames captured when the distance between the flying object 20 and the inspection target is within the distance threshold range. At this time, the predetermined condition may be that the distance between the flying object 20 and the inspection target be within the distance threshold range.

The controller 13 may receive the positional information acquired by the acquisition interface 24 of the flying object 20 from the flying object 20 via the network 50 and the communication interface 11. The controller 13 may compare the acquired positional information with the positional information for the inspection target stored in advance in the memory 12 to calculate the relative positions of the flying object 20 and the inspection target.

As described above, the information processing apparatus 10 can extract frames when the inspection target is located within the field of view of the camera, thereby improving accuracy when the inspection target is inspected. Additionally, since the information processing apparatus 10 need not necessarily calculate the similarity, the load of the calculation process by the image extractor 132 can be reduced.

In the above embodiment, the information processing apparatus 10 has been described as extracting a plurality of consecutive frames for which the average value of the calculated similarity is equal to or greater than a threshold as the analysis target, but this configuration is not limiting. The information processing apparatus 10 may select the extraction range for extracting frames by any appropriate method based on the calculated similarity. For example, the information processing apparatus 10 may select, as the extraction range, a predetermined range based on the frame with the highest similarity, without performing the process for comparison with the threshold.

In the above embodiment, the information processing apparatus 10 extracts a frame group included in a predetermined time oft seconds, as illustrated in FIG. 5 and Table 1, but the information processing apparatus 10 may extract a frame group as the analysis target by calculating the average similarity for a group of n frames (n being an integer) specified in advance.

In this case, the image extractor 132 of the information processing apparatus 10 first calculates the average value of the similarity from the first frame as the start frame to the $n^{th}$ frame as the end frame. The image extractor 132 sequentially calculates the average value of the similarity for n frames while incrementing the start frame and the end frame.

The image extractor 132 then extracts a frame group with an average value equal to or greater than a threshold as the analysis target.

In the above embodiment, the information processing apparatus 10 has been described as performing a filtering process on the frame upon determining that the similarity is less than the threshold, but this configuration is not limiting. The information processing apparatus 10 may perform a process to update the threshold instead of or in addition to the filtering process. By performing the process to update the threshold, the information processing apparatus 10 can adjust the threshold within a range such that the inspection accuracy does not deteriorate, even in cases in which the overall similarity has decreased due to the image capture conditions to the point that no frame range can be extracted with the current threshold. This enables the information processing apparatus 10 to salvage data for which a determination of abnormality in the inspection target can be made.

In the above embodiment, the information processing apparatus 10 has been described as extracting feature points from frames and performing image processing on the frames so that the positions of the extracted feature points match in a plurality of consecutive frames, but this configuration is not limiting. The information processing apparatus 10 need not perform such image processing.

In the above embodiment, the information processing system 1 has been described as including the flying object 20 and the terminal apparatus 40 in addition to the information processing apparatus 10, but this configuration is not limiting. In addition to the information processing apparatus 10, the information processing system 1 may include the flying object 20 alone, without including the terminal apparatus 40.

In the above embodiment, the flying object 20 has been described as any flying object without a human passenger, but this configuration is not limiting. The flying object 20 may be any flying object that a human can board.

In the above embodiment, the information processing apparatus 10 has been described as receiving the video captured by the flying object 20 as data from the flying object 20 via the network 50 and the communication interface 11, but this configuration is not limiting. The information processing apparatus 10 may acquire the video data from the flying object 20 via a recording medium, such as an SD card, instead of or in addition to the network 50.

In addition to the functional blocks described above using FIG. 3, the controller 13 of the information processing apparatus 10 may further include an operating rate calculator that calculates the operation status from the operating frequency of the inspection target. This enables the information processing apparatus 10 not only to make a determination of abnormality in the inspection target but also to calculate and notify the user of the operation status of the inspection target that becomes the analysis target.

The invention claimed is:

1. An information processing apparatus comprising:
an image acquisition interface configured to acquire a video of an inspection target from a flying object, the video having been taken by the flying object in flight;
a memory storing a reference still image serving as a reference for analysis and including a still image of the periodically rotating inspection target captured in advance by the flying object and a threshold of similarity between the reference still image and frames included in the acquired video;
an image extractor configured to calculate the similarity to the reference still image for each frame and extract a plurality of consecutive frames as an analysis target based on the similarity and the threshold;
a position adjuster configured to control a movement of the flying object by transmitting a control information to the flying object; and
an image analyzer configured to extract feature points from the frames and perform image processing on the frames so that positions of the extracted feature points match in the plurality of consecutive frames,
wherein the image extractor calculates an average value of the similarity of the plurality of consecutive frames while shifting the frames and extracts a plurality of consecutive frames for which the calculated average value is equal to or greater than the threshold as the analysis target, and
wherein the image analyzer is configured to virtually fix a camera viewpoint in the image processing and calculate a number of revolutions per unit time from an amount of change in pixel values of the inspection target per unit time when the inspection target is viewed from the fixed viewpoint.

2. The information processing apparatus according to claim 1, wherein the image extractor performs a filtering process on the frame in a case in which the similarity is determined to be less than the threshold.

3. The information processing apparatus according to claim 1, wherein the image analyzer calculates an operating frequency of the inspection target from the plurality of consecutive frames subjected to the image processing.

4. The information processing apparatus according to claim 3, wherein
the memory stores a threshold range of the operating frequency, and
the information processing apparatus further comprises an abnormality determination unit configured to determine that operation of the inspection target is abnormal in a case in which the operating frequency is outside the threshold range.

5. The information processing apparatus according to claim 1, wherein
the memory stores a distance threshold range indicating a range of distances between the flying object and the inspection target, and
the position adjuster is configured to displace the flying object so that a distance acquired from the flying object falls within the distance threshold range in a case in which the distance is outside the distance threshold range.

6. The information processing apparatus according to claim 1, wherein the image analyzer is configured to perform the image processing so that positions of the feature points match in all of the frames of the plurality of consecutive frames.

* * * * *